United States Patent [19]
Mullen, Jr.

[11] Patent Number: 6,070,196
[45] Date of Patent: May 30, 2000

[54] PROTOCOL CONVERTER CONTROLLER HAVING DISTRIBUTED ARCHITECTURE

[75] Inventor: Robert E. Mullen, Jr., Creedmore, N.C.

[73] Assignee: Mitsubishi Semiconductor America, Inc., Durham, N.C.

[21] Appl. No.: 08/857,256

[22] Filed: May 16, 1997

Related U.S. Application Data

[63] Continuation-in-part of application No. 08/190,389, Feb. 2, 1994.

[51] Int. Cl.[7] .............................. G06F 13/38; G06F 15/17
[52] U.S. Cl. ........................... 709/250; 709/214; 370/463
[58] Field of Search ........................ 395/200.44, 200.45, 395/200.8, 827, 848; 709/214, 215, 250; 370/463, 469

[56] References Cited

U.S. PATENT DOCUMENTS

| | | | |
|---|---|---|---|
| 5,193,110 | 3/1993 | Jones et al. | |
| 5,787,255 | 7/1998 | Parlan et al. | 709/250 |
| 5,832,216 | 11/1998 | Szczepauek | 395/200.8 |
| 5,867,673 | 2/1999 | Gustin et al. | 395/200.8 |

Primary Examiner—Mark H. Rinehart
Attorney, Agent, or Firm—McDermott, Will & Emery

[57] ABSTRACT

A protocol converter is provided for interfacing a host computer to manufacturing process equipment. Via a parallel input/output interface (PIO), a data acquisition system is coupled to the process equipment to check and activate various process equipment events. A user terminal provides a graphical user interface for controlling and monitoring the protocol converter. A protocol converter (PC) controller that enables the host computer, the data acquisition system and the user interface to exchange messages with the process equipment comprises a protocol conversion server (PCS) for interfacing the PC controller to the host computer, and the process equipment, a user interface server (UIS) for providing interface to the user terminal, and a data acquisition server (DAS) for supporting the PIO. A separate external mailbox is assigned to each of the servers to receive incoming messages from other servers in the PC controller. In addition, the PCS contains a distributed internal bus having internal mailboxes for providing communications between software processes run by various modules within the PCS. A separate internal mailbox is assigned to each module that receives messages from the internal bus. Messages supplied to the internal bus are distributed among mailboxes of receiving modules in accordance with transaction IDs of the messages.

25 Claims, 11 Drawing Sheets

Fig. 1

| Message Length F(n) | Header | Data | Check Sum CS |
|---|---|---|---|
| Length of the message to be sent | Destinations | Communication Content | Communication error detecting code |

| Component | Direction |
|---|---|
| 1. Host-PC Controller | |
| Available for Processing | <== |
| Start Processing Instruction | ==> |
| Load Start | <== |
| Process Start | <== |
| Process End | <== |
| On-line Process Completed | <== |
| Communication Test | <=> |
| Process Status Query | ==> |
| Process Status Reply | <== |
| Error Message | <== |
| | |
| 2. PC Controller-Equipment | |
| Same as above but different message/transaction formats | |
| | |
| 3. S/W Support Work Station / User I/F CRT - PC Controler | |
| Monitor Status | ==> |
| Modify Configuration | ==> |
| View Error / Communication Logs | ==> |
| Communication Test / Retry | ==> |
| Print Instruction | ==> |
| | |
| 4. PC Controller-Data Acquisition System | |
| Activate External Switch | ==> |
| Detect Switch Closure | <== |

PROTOCOL CONVERTER CONTROLLER HAVING DISTRIBUTED ARCHITECTURE

This patent application is a continuation-in-part application of U.S. application Ser. No. 08/190,389 filed Feb. 2, 1994.

TECHNICAL FIELD

This invention relates generally to data communications protocol conversion, and more particularly, to a protocol converter for interfacing various on-line process equipment with a host computer in a semiconductor manufacturing environment.

BACKGROUND ART

Currently, there is no standard mode of communication between intelligent systems in a computer integrated semiconductor manufacturing environment. As a result, protocol converter systems are employed to act as translators to allow intelligent devices from different manufacturers to communicate with one another. The special purpose protocol converter systems intended to convert specific communications protocols in a manufacturing environment are extremely expensive and designed hard-coded to a specific piece of equipment. The existing general purpose protocol converters are primarily intended for connection of devices with different handshaking schemes, i.e. computer to printer, or between different networks. These converters are not sophisticated enough to provide even minimal functionality in a semiconductor manufacturing environment. For example, the existing protocol converters cannot provide without extensive modifications:

configurability for different applications in a manufacturing environment, extensibility to various communication protocols, local and host control of data processing, ability to sample equipment status variables, ability to handle quality control (QC) data, graphical user interface, high data conversion/throughput rates, remote system access and maintenance, error checking, handling and logging capability, message reformatting capability, parallel input/output (I/O) interface to process equipment for checking and activating various manufacturing events, adherence to specific communication standards.

In view of the above, it would be desirable to provide an improved general purpose data communications protocol converter that addresses some or all of the above-indicated preferences.

DISCLOSURE OF THE INVENTION

Accordingly, one advantage of the invention is in providing a general purpose data communications protocol converter which is easily configurable for different applications in a manufacturing environment.

Another advantage of the invention is in providing a protocol converter extensible to various communication protocols.

Another advantage of the invention is in providing a protocol converter with increased data conversion/throughput rates.

Another advantage of the invention is in providing remote system access and maintenance of a protocol converter.

A further advantage of the invention is in providing a protocol converter having ability to perform error checking of message contents and message reformatting.

Another advantage of the invention is in providing a protocol converter having a parallel input/output (I/O) link to the process equipment for checking and activating various manufacturing events.

A further advantage of the invention is in providing a protocol converter having a graphical user interface that provides log viewing capabilities.

Another advantage of the invention is in providing a protocol converter that can meet specific industry communication standards.

A further advantage of the invention is in providing a low cost semiconductor industry specific communication standard protocol converter.

The above and other advantages of the invention are achieved, at least in part, by providing a controller having distributed architecture in a protocol converter that supports data communications with manufacturing process equipment controlled by a host computer. The controller is coupled between the host computer and the process equipment for converting host messages sent by the host computer in a first format into a second format suitable for the process equipment, and for converting equipment messages sent by the process equipment in the second format into the first format. The conversion is handled on a transaction by transaction basis. A data acquisition system is coupled between the controller and the process equipment for activating and checking process equipment events. A user terminal is coupled to the controller for supporting user access to the controller.

The controller includes a protocol conversion server (PCS) for providing data exchange between the host computer and the process equipment. A data acquisition server (DAS) supports communications between the data acquisition system and the process equipment. A user interface server (UIS) provides interface to the user terminal. The servers interact with each other using external mailboxes assigned to each server. In particular, a PCS mailbox is assigned to the PCS for receiving messages from the DAS and UIS for delivery to the PCS. A DAS mailbox is assigned to the DAS for receiving messages from the PCS for delivery to the DAS, and an UIS mailbox is assigned to the UIS for receiving messages from the PCS for delivery to the UIS.

In accordance with one aspect of the present invention, the PCS may comprise a plurality of modules for running various software processes that support PCS operations. Data communications between the modules may be carried out via an internal bus. Producing modules may supply data to the internal bus, whereas consuming modules may receive data from the internal bus.

Preferably, the internal bus comprises multiple internal mailboxes assigned to the consuming modules. Messages supplied to the internal bus by the producing modules may be distributed among the internal mailboxes in accordance with ID information provided by the producing modules. Each of the consuming modules may be assigned to a separate internal mailbox.

In accordance with another aspect of the invention, the internal bus may provide priority communications between the modules. A separate priority mailbox may be assigned to each of the consuming modules for receiving priority data. For example, messages received from the data acquisition system are distributed via the priority mailboxes.

In accordance with a further aspect of the invention, the process equipment may comprise multiple process units. The data acquisition system may provide a parallel data input/output interface with the multiple process units to support independent data exchange with each of them. The PCS may comprise multiple PCS instances for providing communications with the multiple process units. A separate PCS instance may be assigned to each of the process units.

In accordance with another aspect of the invention, a controller for supporting data communications with manufacturing process equipment may comprise a protocol conversion server (PCS) for interfacing the process equipment to a host computer, and an external device server (EDS) for interfacing the process equipment to an external device. An external PCS mailbox may be assigned to the PCS for receiving messages from the EDS for delivery to the PCS, and an EDS mailbox may be assigned to the EDS for receiving messages from the PCS for delivery to the EDS. The PCS may comprise a plurality of modules for running various processes to support PCS operations, and an internal bus for distributing messages among the modules, which include producing modules for supplying data to the internal bus, and consuming modules for receiving data from the internal bus.

In accordance with a further aspect of the invention, the producing modules may comprise a host request module for receiving request messages from the host computer, and an external request module for receiving messages delivered to the external PCS mailbox. The consuming modules may comprise a host reply module for transmitting reply messages to the host processor, and an external device module for sending messages to the EDS mailbox.

In accordance with another aspect of the invention, an equipment communication module may be incorporated for providing bidirectional communication with the process equipment, and with the producing and consuming modules.

In accordance with a further aspect of the invention, the PCS may include a data collection module that provides bidirectional communications with the process equipment via the equipment communication module, for collecting a quality control data from the process equipment. The data collection module may receive a request for the quality control data from its internal mailbox.

Still other advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BEST MODE FOR CARRYING OUT THE INVENTION

The best mode for practicing the invention is based on the realization that the host computer and process equipment communicate with each other using Semiconductor Equipment Communication Standard (SECS) protocols in a semiconductor manufacturing environment.

To more fully appreciate the principles of this invention, the SECS protocols will be described. These protocols were established by the Semiconductor Equipment and Materials Institute, Inc. (SEMI) to provide means for communication between intelligent devices in a semiconductor manufacturing environment. The SECS-1 standard was published in 1980. The SECS-2 standard specification was first published in 1982 and has been revised several times since then. The SECS-1 prescribes a communication interface pertaining to message exchange between equipment and a computer and, in particular, provides the basic mechanisms for electrical connectivity, message format and line protocol. The SECS-2 prescribes a method for interpreting messages between a computer and equipment. More specifically, in addition to SECS-1, SECS-2 specifies conventions for data items formats, message formats, and conversations. MSEC is a Mitsubishi specific variation of SECS-2 that is the same in most respects except for that different conventions are used for data item, message format and conversations. For example, SECS-2 specifies message type in the header, while MSEC uses the first several bytes of the data portion of the message. Also, SECS-1, SECS-2 and MSEC define connection of a communication cable to a host computer and prescribe the type of connector, number of pins and signal voltage.

Figure 1:
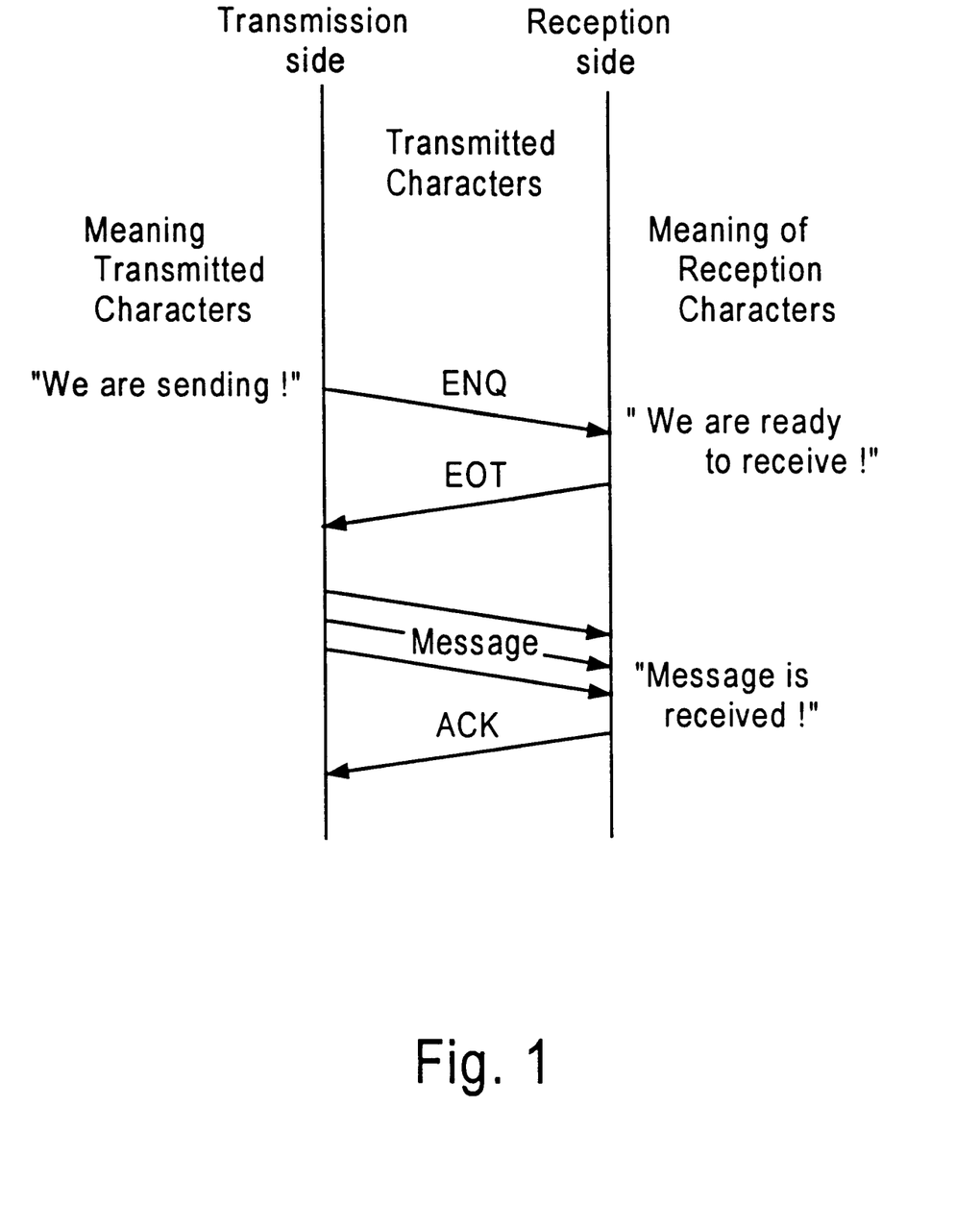
FIG. 1 illustrates a communication procedure in accordance with the SECS protocol.
Figure 2:
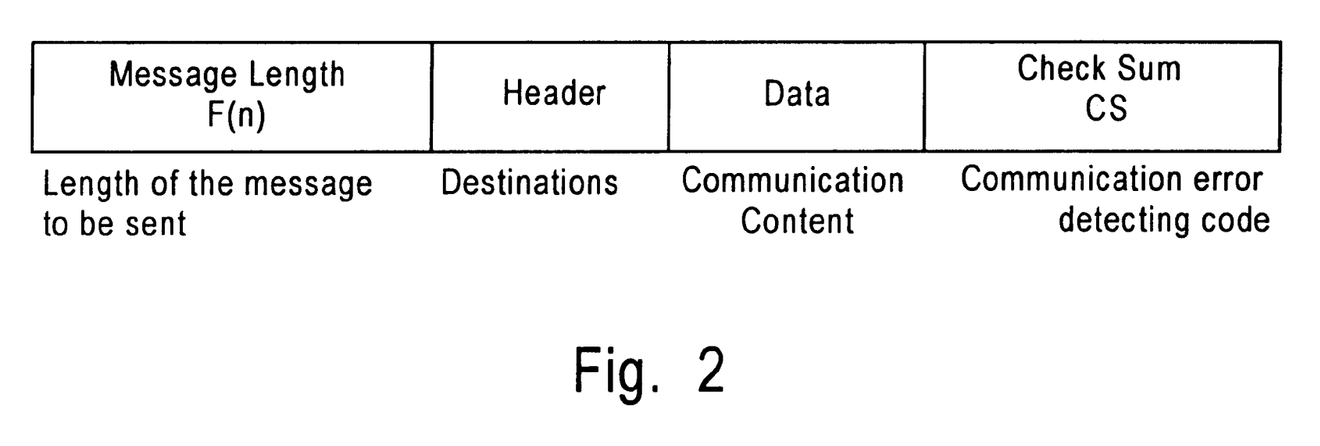
FIG. 2 shows the contents of a message sent in accordance with the protocol illustrated in FIG. 1.

The communication procedure prescribed by the SECS for data exchange is illustrated in FIG. 1. Communication characters are used in this procedure to provide synchronization and determine the start of a particular field within a data block. A transmission side sends the communication character ENQ (inquiry) to indicate the start of transmission. A reception side responses with the character EOT (end of transmission) to show its readiness to receive a message. In response, the transmission side sends the message, content of which is illustrated in FIG. 2. The reception side replies with the communication character ACK (acknowledge) to acknowledge that the message is received.

As shown in FIG. 2, the first field of the message defines the length of the message to be sent. This field is followed by the header that may contain a source or destination code (address) to define source or destination of the message. The data field comprises communication contents (text) of the message. The text may, for example, establish rules for timing during transmission, prescribe how to set the operational parameters of the equipment, and how to output the process result data. The last field (Check Sum) defines a communication error detecting code to be used for error checking.

To operate the equipment automatically, the text of the message prescribes treatment for communication errors and measures to analyze the errors. In particular, the measures to cope with abnormal messages are prescribed (for example, retry or error display). To analyze the errors, storage of communication history (logs) and the display format may be prescribed. Further, the text may prescribe on-line operation of the equipment under the instructions of the host computer, and off-line operation performed manually. Moreover, when the equipment is switched from on-line operation to off-line operation, the measures to be taken may be prescribed.

For example, to enable a robot to handle a cassette onto the equipment, the configuration and the control sequence of the cassette stage, as well as the way to send the signals of the cassette stage to inform the robot about the existence of a cassette on the cassette stage, may be prescribed in the text.

Figure 3:
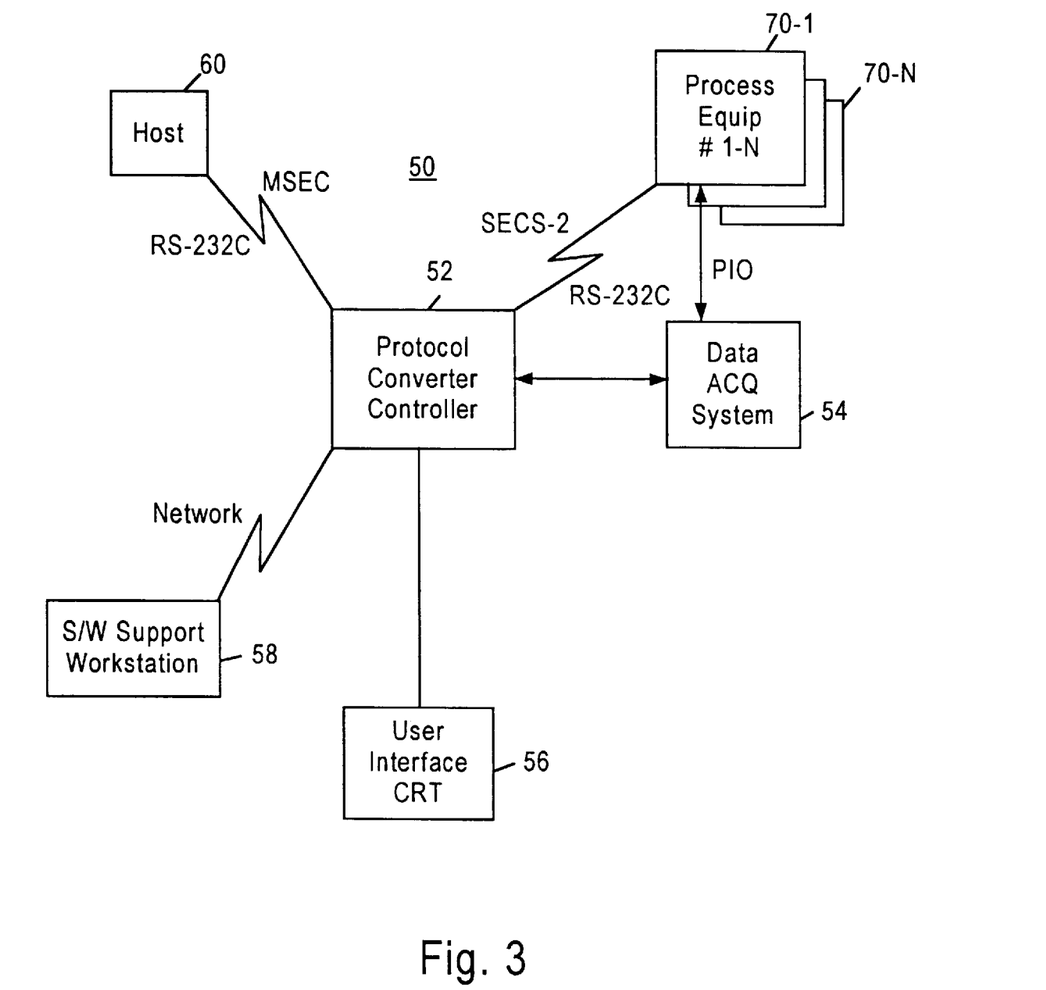
FIG. 3 illustrates a configuration of a protocol converter in accordance with the present invention.

Reference is now made to FIG. 3, showing an exemplary block-diagram of a data communications protocol converter 50 that provides an interface between a host computer 60 operating in accordance with the MSEC standard and process equipment 70 composed of N process units 70-1, 70-2, . . . , 70-n, . . . , 70-N communicating in accordance with the SECS-2 standard. The protocol converter 50 comprises a protocol converter controller 52 coupled between the host computer 60 and the process equipment 70 through the RS-232C type interface to provide data conversion. A data acquisition (ACQ) system 54 is coupled between the controller 52 and the process equipment 70 to provide a parallel digital I/O (PIO) to the process equipment, which allows the system to check for and activate TTL logic signals from/to the process equipment. For example, the system is enabled to check or activate switch closure in the equipment to signal an error condition, process start, process end, detect workpiece (cassette) presence, equipment interlock, etc. A user interface 56 is coupled to the controller 52 to enable a user to operate the protocol converter. The user interface 56 may be a terminal equipped with a keyboard and a monitor for displaying a graphical user interface (GUI) . For example, the user interface allows the user to specify parameters for the above-indicated interaction through the parallel interface. A software support workstation 58 may be coupled to the controller 52 through a telecommunication network, e.g. Ethernet, to provide the controller with additional functional capabilities. It allows the system to accommodate various equipment-specific portions of the software for all possible application scenarios. As a result, one standardized platform can provide all necessary protocol converter implementations. Moreover, the workstation 58 enables a user to remotely interact with the protocol converter through a network.

Figure 4:
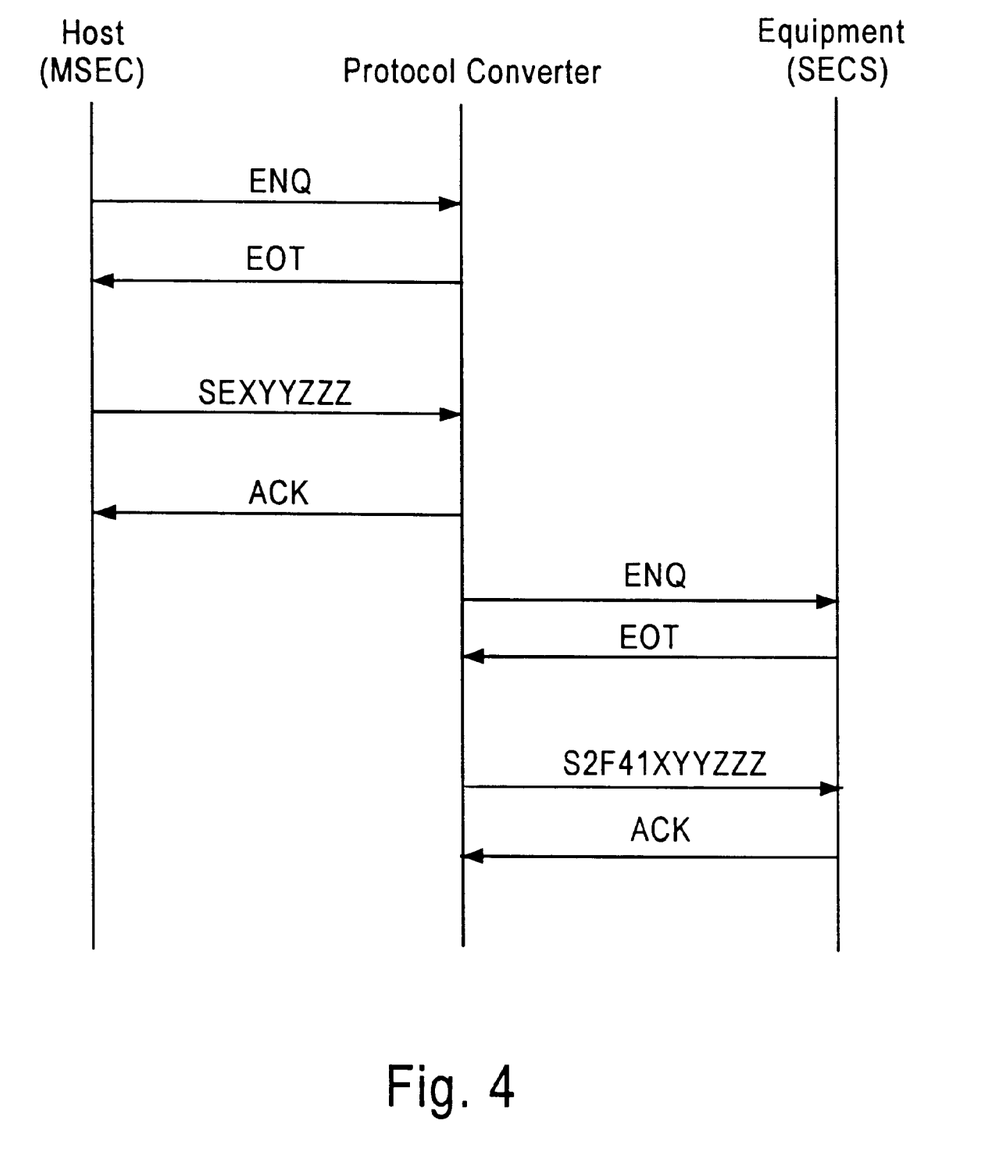
FIG. 4 shows an example of protocol conversion.

An example of data exchange between the MSEC host computer 60 and the SECS-2 process equipment 70 is shown in FIG. 4. The protocol converter relays the communication characters ENQ, EOT and ACK shown in FIG. 1 and further converts the message SEXYYZZZ transmitted by the host computer in accordance with MSEC protocol into the message S2F41XYYZZZ corresponding to the SECS-2 protocol of the process equipment 70.

Figure 5:
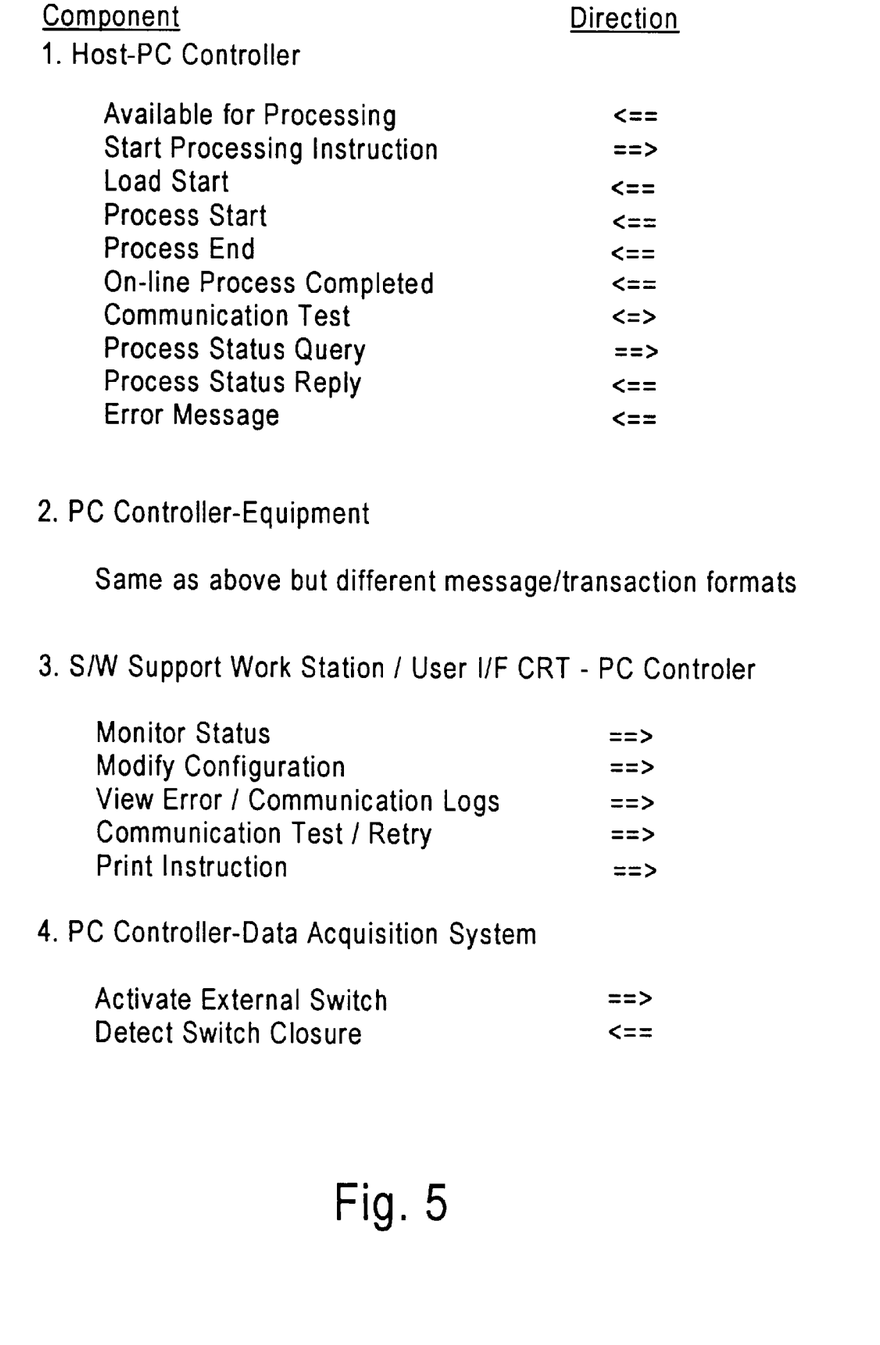
FIG. 5 illustrates examples of interaction between the converter components shown in FIG. 3.

As shown in FIG. 5, wherein the examples of interactions between the hardware components in FIG. 3 are illustrated, the host computer 60 may send to each process unit 70-n of the process equipment 70 through the protocol converter (PC) controller 52 signals to start processing instructions or to inquire process status.

The process unit 70-n may inform the host computer 60 through the PC controller 52 regarding its availability for processing, load start, process start and end, on-line process completion or various errors. Further, a communication test may be performed to check various parameters of data communication between host computer and PC controller, and between PC controller and equipment.

In addition to data exchange between the host computer and process equipment, the data ACQ system may detect the equipment switch closure indicating particular operation conditions of the process equipment and inform the PC controller about this event. Moreover, the PC controller may activate an external switch of the process equipment in accordance with an instruction from a user or the host computer to set particular modes of operation or process parameters.

The user interface 56 and workstation 58 may, for example, monitor status of the PC controller, modify its configuration, supply error or communication logs, request the PC controller to perform communication tests or to print logs.

Figure 6:
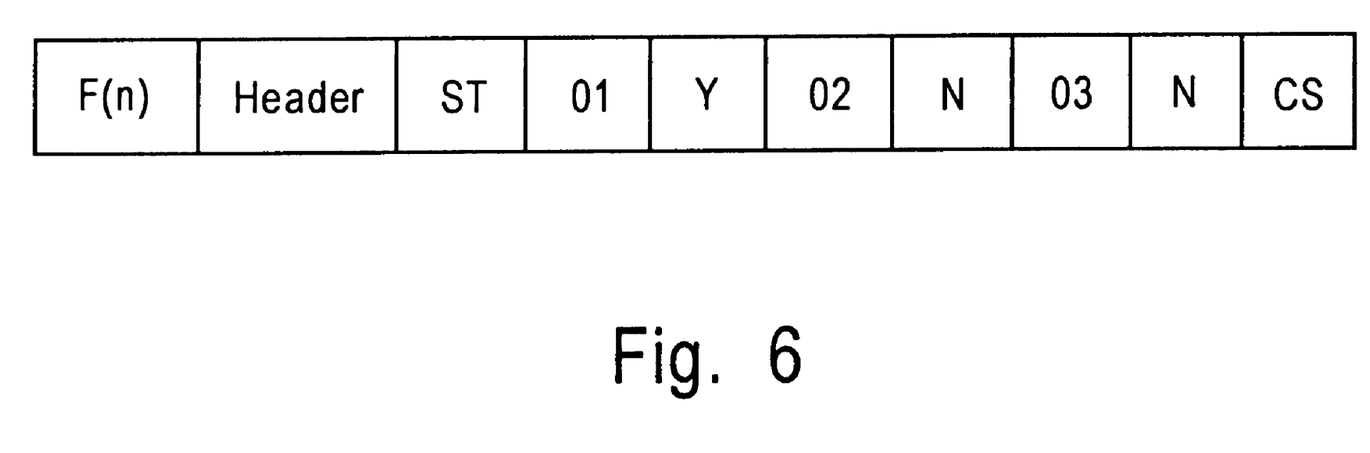
FIG. 6 shows an example of an expression in accordance with MSEC protocol.

An exemplary MSEC message that may be transmitted from the process equipment 70 to the host computer 60 to indicate the start of processing is shown in FIG. 6 The function of the message (type of command) is defined by using characters ST (start) following the header. The functions are set in accordance with the type of the equipment. The next fields are prescribed for each type of equipment according to each command or the function of the message. Such parameters as the number of the lane in which the process is started may be set. Some fields may, for example, require the host computer to poll the digital outputs of the equipment corresponding to certain cassette positions in order to check whether these cassette positions are activated before the processing.

Figure 7:
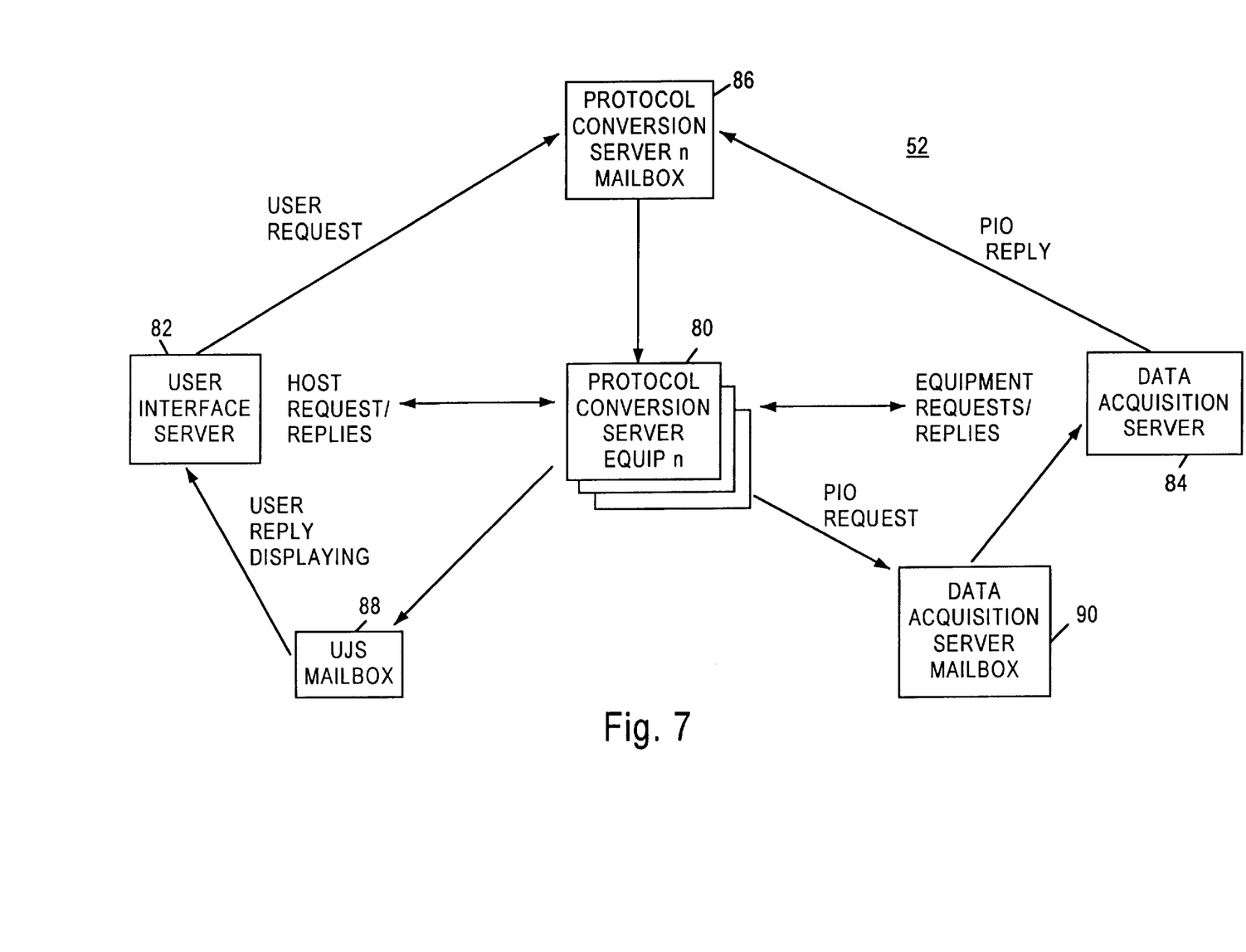
FIG. 7 illustrates architecture of the protocol converter controller shown in FIG. 3.

Reference is now made to FIG. 7 showing the architecture of the protocol converter (PC) controller 52 that comprises a protocol conversion server (PCS) 80 composed of multiple PCS instances 80-n, a user interface server (UIS) 82, and a data acquisition server (DAS) 84. The PC controller 52 may be implemented on a workstation, such as a Sun SparcStation 5 UNIX workstation manufactured by Sun Microsystems. The PCS 80, UIS 82 and DAS 84 may be computer programs run by a UNIX workstation.

A separate PCS instance 80-n of the PCS 80 may be assigned to each process unit 70-n of the process equipment 70 to support protocol conversion of messages sent to or from the process unit 70-n. The UIS 82 supports data exchange between the user interface 56 and the PC controller 52. The DAS 84 is provided to support parallel data communications between the data acquisition system 54 and the PC controller 52.

A separate protocol conversion server (PCS) mailbox 86-n may be assigned to each PCS instance 80-n to receive user requests sent via the UIS 82 and data acquisition system replies sent via the DAS 84. The UIS 82 is provided with a UIS mailbox 88 that receives messages sent via the PCS 80 to the user interface 56. For example, the UIS mailbox 88 may receive GUI messages to be displayed on the monitor in real time. A DAS mailbox 90 is assigned to the DAS 84 to receive requests sent via the PCS 80 to the data acquisition system 54. For example, the data acquisition system 54 may be requested to activate an external switch at the process unit 70-n.

Thus, the PCS mailbox 86-n, UIS mailbox 88 and DAS mailbox 90 respectively receive incoming messages for the PCS instance 80-n, UIS 82 and DAS 84. Any of these servers may sent messages to a mailbox assigned to another server. Each of the servers 80-n, 82 and 84 periodically reads its mailbox, for example, once a millisecond. When a message arrives into the mailbox, the corresponding server interrupts execution of its current program and processes the received message. The mailboxes 86-n, 88 and 90 may be implemented by FIFO registers.

Request and reply messages to and from the host computer 60 that relate to the process unit 70-n are supplied directly to the PCS instance 80-n assigned to the process unit 70-n. Request and reply messages to and from the process unit 70-n are also provided directly to the PCS instance 80-n.

For example, when the process unit 70-n is brought in an on-line mode, it sends an equipment request message to the PCS instance 80-n indicating that the process equipment is ready. The PCS instance 80-n checks the message and determines whether the product required for processing is available. If so, the PCS instance 80-n sends a request for the product to the host computer 60. In response, the host computer 60 may send via the PCS instance 80-n a message to the process unit 70-n to notify it that the product will arrive. The structure and operations of the PCS 80 are disclosed in more detail below.

Figure 8:
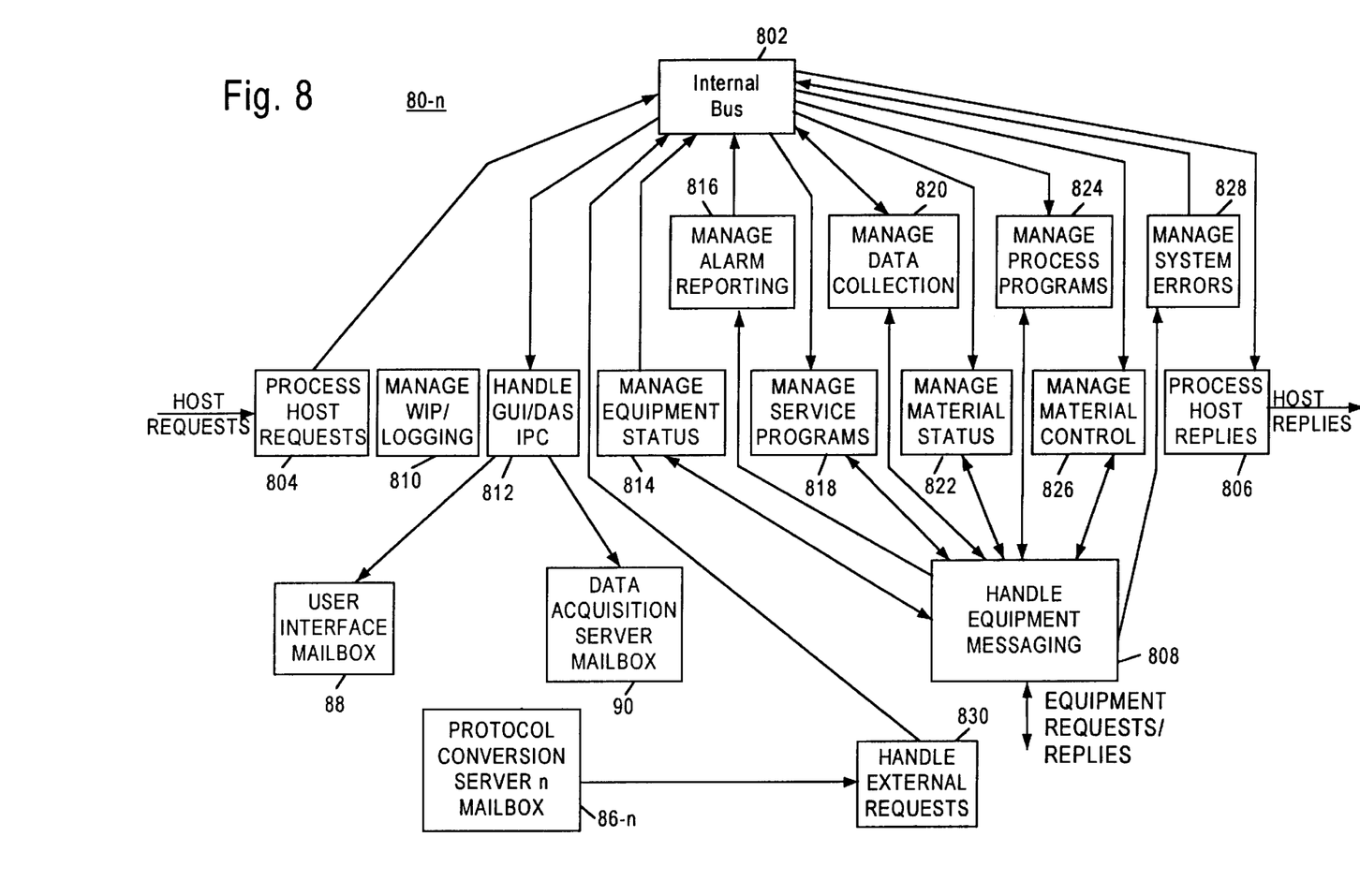
FIG. 8 shows architecture of one of protocol conversion server instances shown in FIG. 7.

As shown in FIG. 8, each PCS instance 80-n comprises multiple software modules carrying out various processes that support the protocol conversion of messages transmitted to and from the process unit 70-n, to which the PCS 80-n is assigned. Each PCS 80-n contains a distributed internal bus 802 for providing data communications within the PCS instance 80-n between processes run by various software modules.

The software modules responsible for providing external communications include a process host requests module 804 that receives all messages from the host computer 60, extracts the text of a host command from each message, and via the internal bus 802 routes the host command to a required destination. A process host replies module 806 receives from the internal bus 802 all messages addressed to the host, formats them and transmits to the host computer 60. A handle equipment messaging module 808 handles all request and reply messages to and from the process unit 70-1.

Other software modules serve particular requests received by the PCS instance 80-n. In particular, a manage work-in-progress (WIP)/logging module 810 allows the user to monitor working progress information, for example, information on a delivered product or a recipe being used. The WIP/logging module 810 creates various logs used in the PC controller 52, for example, a historical log that allows the GUI to display data transferred between the process equipment 70 and the host computer 60 historically. An error log may be created to enable the GUI to display process errors historically or in real time. A quality control (QC) log may be created to maintain QC information on the process unit 70-n.

A handle GUI/DAS interprocess communication (IPC) module 812 coordinates the interaction between the PCS instance 80-n and the UIS 82, and between the PCS instance 80-n and the DAS 84. The handle GUI/DAS IPC module 812 serves as a router to transfer messages from the PCS instance 80-n to the UIS mailbox 88 and the DAS mailbox 90, and to receive external request messages from the PCS mailbox 86-n.

A manage equipment status module 814 checks the status of the process unit 70-n in response to a request from the host computer 60 or a user's request from the user interface 56. For example, the module 814 may check whether cassette sensors at the process unit 70-n are activated. Requests for equipment status, and replies from the process unit 70-n are transferred via the handle equipment messaging module 808.

A manage alarm reporting module 816 handles events relating to alarm messages from the process unit 70-n. Each time an alarm occurs, an alarm message is sent from the process unit 70-n via the handle equipment messaging module 808. The manage alarm reporting module 816 may repackage the alarm message into the form suitable for the host computer 60. Via the internal bus 802, the repackaged alarm message may be transferred to the process host replies module 806 for transmitting to the host computer 60. Also, the manage alarm reporting module 816 may transfer the alarm message to the manage WIP/logging module 810 to log the alarm in an error log.

In response to a message from the process host requests module 804, a manage service programs module 818 initiates process equipment commands, such as "close the door," or "start processing," sent to the process unit 70-n. The process equipment commands are transferred to the process unit 70-n via the handle equipment messaging module 808.

A manage data collection module 820 configures the process unit 70-n to provide a quality control (QC) data collection report, and handles the QC data collection report sent by the process unit 70-n. Once the QC data collection report is completed, the manage data collection module 820 sends it to the host processor 60. Interactions with the process unit 70-n are provided via the handle equipment messaging module 808. A procedure carried out by the manage data collection module 820 to enable the process unit 70-n to provide a QC data collection report is disclosed in more detail later.

A manage material status module 822 interacts with the process unit 70-n via the handle equipment messaging module 808 to collect information on manufacturing products delivered to the process unit 70-n. For example, via a SECS transaction, the module 822 determines that the process unit 70-n is ready to receive a cassette with a product, and detects the arrival of the cassette on input lanes of the process unit 70-n.

A manage process programs module 824 handles communications that relate to programs run by the process unit 70-n. For example, the module 824 manages a request from the process unit 70-n for use of a particular program, and handles a request from the user interface 56 to provide a directory of process programs.

A manage material control module 826 handles control operations that relate to manufacturing products. For example, the module 826 may receive a message from the process unit 70-n that the process equipment 70 is ready to send a product, process the message and send it to the host computer 60.

A manage system errors module 828 handles system errors relating to protocol conversion, for example, when the process unit 70-n receives an unrecognizable message, or no reply from the protocol converter is received on a request from the process unit. When an error is detected, the module 828 causes an error message to be logged in an error log, and routes the error message to the process host replies module 806 for transmitting it to the host 60.

A handle external requests module 830 receives an incoming message from the UIS 82 or DAS 84 via the PCS mailbox 86-n. Via the internal bus 802, the module 830 routes the message to any of the PCS modules 804–828 responsible for handling the process initiated by the message. Operations of the handle external requests module 830 are disclosed in more detail later.

It should be understood that the diagram in FIG. 8 presents examples of PCS modules that may run various processes in the protocol converter of the present invention. The PCS 80 may use any process modules appropriate for a particular manufacturing environment.

As discussed above, the PCS 80-n uses its distributed internal bus 802 to interconnect the PCS modules 804–828 that run various processes involved in protocol conversion. The PCS modules that supply messages to the internal bus 802 are called producers. The PCS modules that receive messages from the internal bus 802 are called consumers. For example, as shown in FIG. 8, each of the modules 804, 816, 828, and 830 acts as a producer. The modules 806, 810, 812, 818, 822, 824, and 826 are consumers. Some of the modules, such as modules 814, and 820, combine producer functions with consumer functions. The processes run by these combined modules involve supplying messages to the internal bus 802, and receiving messages from the internal bus 802.

Figure 9:
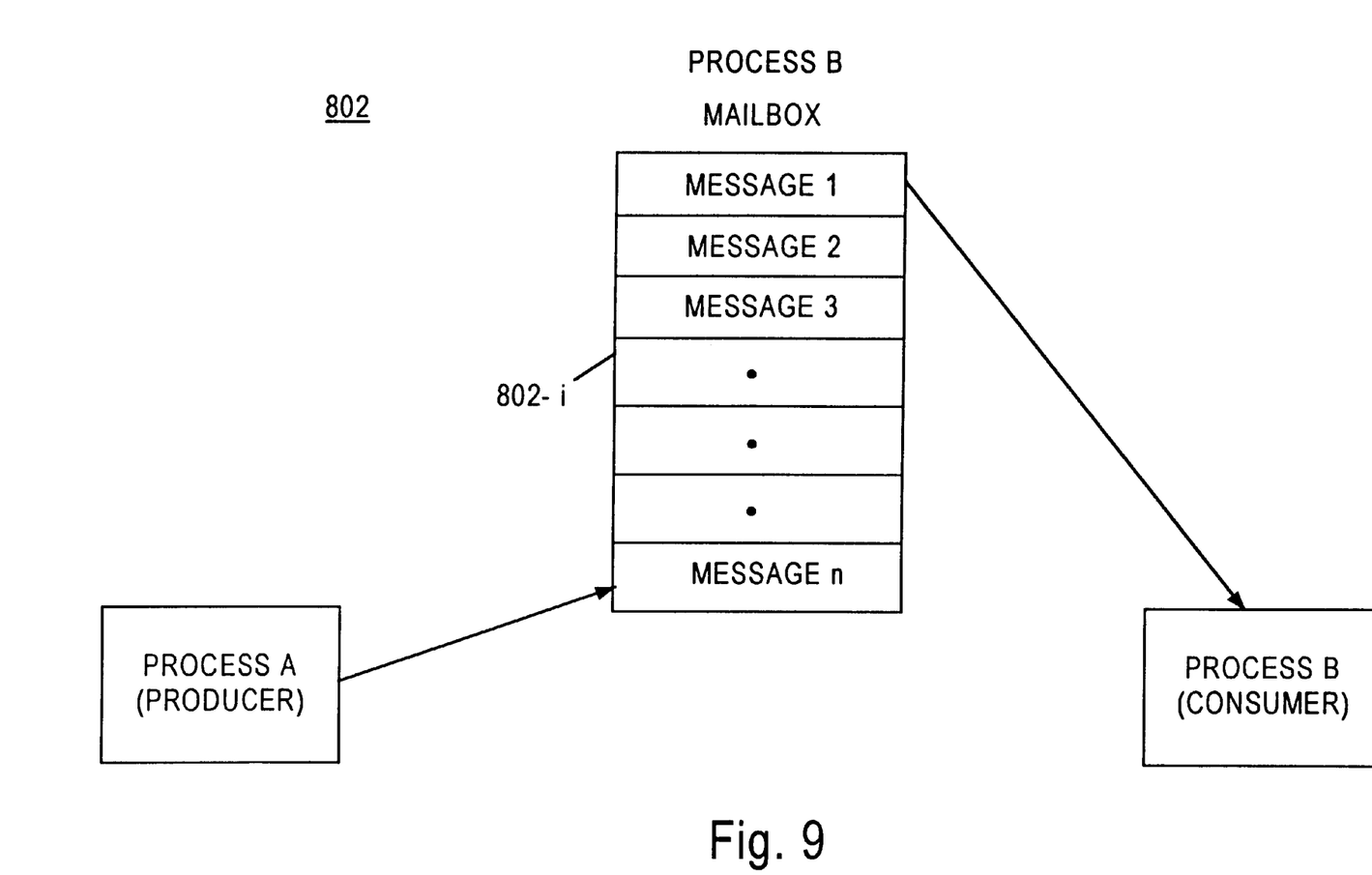
FIG. 9 illustrates an internal mailbox in the internal bus shown in FIG. 8.

As illustrated in FIG. 9, the distributed internal bus 802 contains internal mailboxes 802-i provided between the producers and the consumers. A separate internal mailbox 802-i is assigned to each consumer within the PCS 80-n. The internal mailbox 802-i comprises a FIFO register that maintains a queue of messages addressed to a given consumer. The messages for each internal mailbox 802-i may be supplied from any producer in the PCS 80-n. The producers provide their messages with transaction IDs that identify destinations of the messages. Messages from each producer are distributed among the internal mailboxes 802-i in accordance with transaction IDs of the messages. Each consumer periodically reads its internal mailbox 802-i. When a message is detected in the mailbox, the consumer is activated to read and process the message. Messages accumulated in the internal mailbox 802-i are read by the consumer in chronological order.

For instance, a MSEC message from the host computer 60 is handled by the process host requests module 804 that extracts the text of a command from the message, and directs it to the internal mailbox 802-i of an appropriate module of the PCS 80-n. For example, the host command may be forwarded to the internal mailbox 80-i assigned to the manage equipment status module 814 that receives the command from its internal mailbox, and sends a corresponding SECS-2 message via the handle equipment messaging module 808 to the process unit 70-n. The process unit 70-n may respond with a SECS-2 reply message. The manage equipment status module 814 may process the reply message, and forward it to the internal mailbox 80-i of the process host replies module 806 that receives the message from its mailbox and send it in the MSEC format to the host computer 60.

The distributed internal bus 802 may be arranged to provide priority to certain categories of incoming messages. In addition to the regular internal mailbox 802-i, each consumer may be assigned with a priority mailbox for delivery of priority messages.

Figure 10:
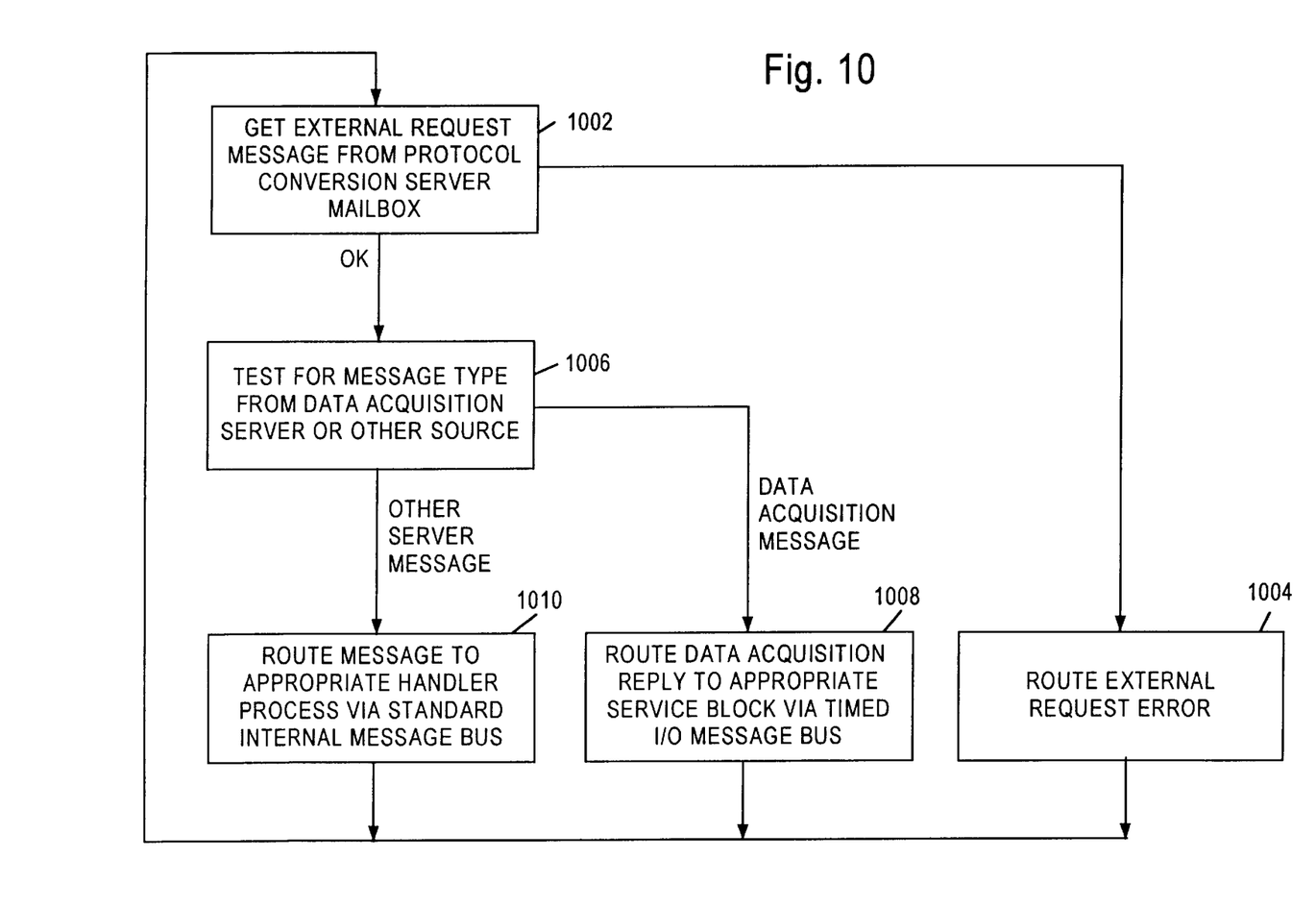
FIG. 10 illustrates the handle external request module shown in FIG. 8.

In particular, reply messages from the DAS 84 may have priority over messages received from other sources. As illustrated in FIG. 10, the handle external requests module 830 receives an external request message from the PCS mailbox 86-n (block 1002) that maintains messages from the UIS 82 and DAS 84. If the external request message contains an error, the module 830 generates an external request error message (block 1004), forwards it to the host 60, and waits for a new external request message.

If no error is detected, the module 830 tests the external request message (block 1006) to determine whether it is received from the DAS 84 or from another source. If the message is received from the DAS 84, it is sent to the priority mailbox of the corresponding consumer for immediate delivery (block 1008). If the message is sent from the UIS 82 the module 830 routes it to the regular internal mailbox 802-i of the consumer (block 1010).

Figure 11:
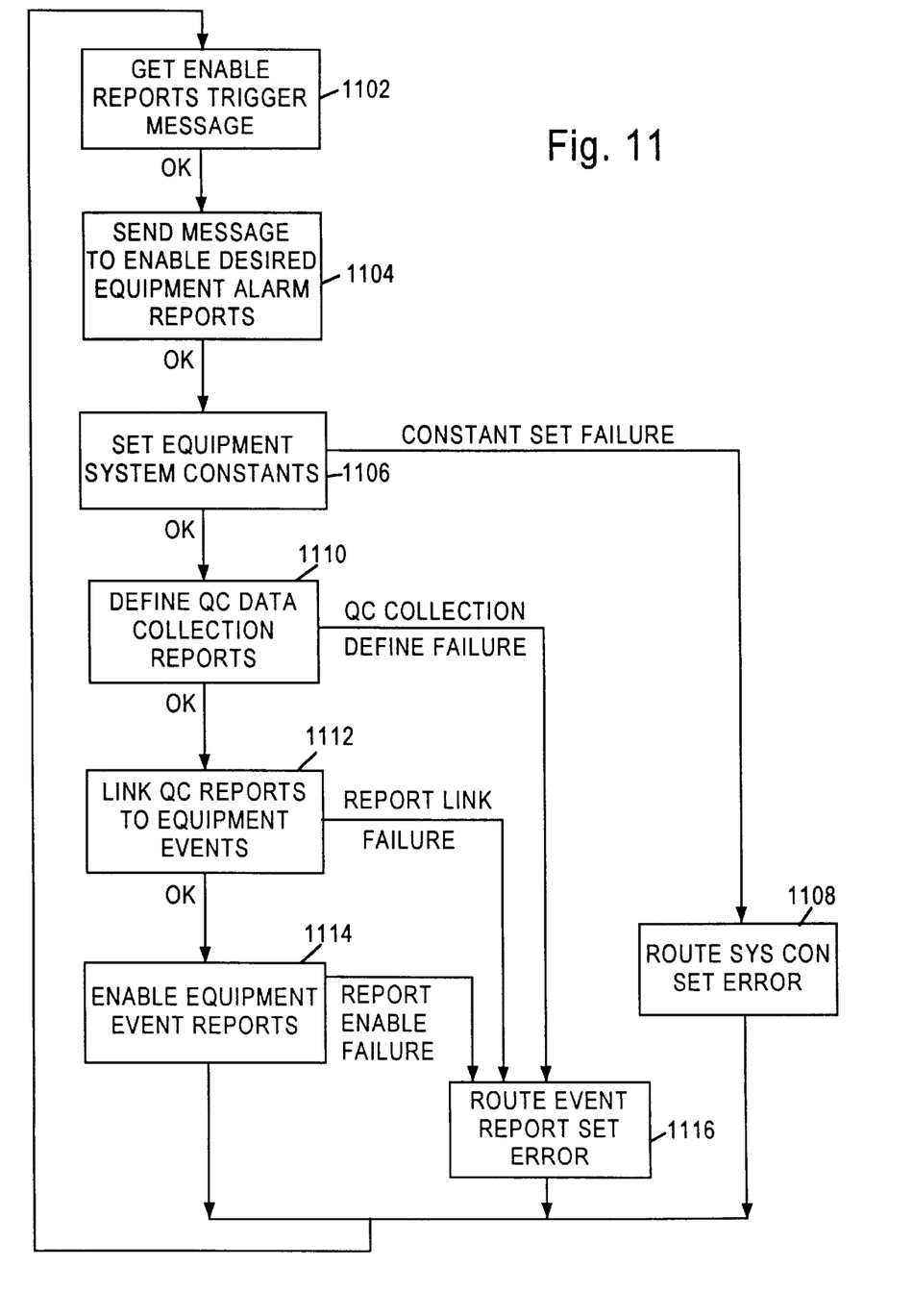
FIG. 11 shows a flow-chart of an exemplary process run by the manage data collection module depicted in FIG. 8.

For example, a message from the UIS 82 may request a QC data collection report from the process equipment 70. As discussed above, QC data collection reports are handled by the manage data collection module 820. As illustrated in FIG. 11, the manage data collection module 820 may receive an enable reports trigger message from its internal mailbox 802-i (block 1102) to initiate generating the QC data collection report. In block 1104, a message is sent to the process unit 70-n to enable desired process equipment to provide an alarm report. In block 1106, the module 820 sets process equipment system constants to be monitored. If the process unit 70-n responds that the system constants cannot be set, for example, because of a wrong mode of operation, a system constants set error is reported to the host processor 60 (block 1108).

If the system constants are set, required QC data collection reports are specified (block 1110). In block 1112, the specified reports are linked to certain asynchronous process equipment events, such as a lot start or end process. Finally, in block 1114, the module 820 enables the process unit 70-n to generate the specified report linked to the defined process equipment event. If any of operations in blocks 1110–1114 fails, an event report set error is reported to the host computer 60 (block 1116).

There accordingly has been described a protocol converter for interfacing a host computer to manufacturing process equipment. A data acquisition system provides a parallel input/output interface (PIO) to the process equipment to check and activate various process equipment events. A user terminal provides a graphical user interface for controlling and monitoring the protocol converter. A protocol converter (PC) controller that enables the host computer, the data acquisition system and the user interface to exchange messages with the process equipment comprises a protocol conversion server (PCS) for interfacing the PC controller to the host computer, and the process equipment, a user interface server (UIS) for providing interface to the user terminal, and a data acquisition server (DAS) for supporting the PIO. A separate external mailbox is assigned to each of the servers to receive incoming messages from other servers in the PC controller. In addition, the PCS contains a distributed internal bus having internal mailboxes for providing communications between software processes run by various modules within the PCS. A separate internal mailbox is assigned to each module that receives messages from the internal bus. Messages supplied to the internal bus are distributed among mailboxes of receiving modules in accordance with transaction IDs of the messages.

Thus, the distributed architecture of the PC controller provides a flexible interface to the process equipment, and allows concurrent tasks to be performed independently.

Therefore, the protocol converter may be configured for different manufacturing applications, and used to convert various communication protocols. Also, data conversion and throughput rates can be increased.

In this disclosure, there are shown and described only the preferred embodiments of the invention, but it is to be understood that the invention is capable of changes and modifications within the scope of the inventive concept as expressed herein.

What is claimed is:

1. A protocol converter for providing data communications with manufacturing process equipment, comprising:
   a host computer for controlling said process equipment,
   a controller coupled between said host computer and said process equipment for converting host messages sent by the host computer in a first format into a second format suitable for said process equipment, and for converting equipment messages sent by said process equipment in said second format into said first format,
   a data acquisition system coupled between said controller and said process equipment for activating and checking process equipment events, and
   a user terminal coupled to said controller for supporting user access to said controller;
   said controller including:
      a protocol conversion server (PCS) for providing data exchange between said host computer and said process equipment,
      a data acquisition server (DAS) for supporting communications between said data acquisition system and said process equipment,
      a user interface server (UIS) for interfacing said user terminal to said controller,
      a PCS mailbox assigned to said PCS for receiving messages from said DAS and UIS for delivery to said PCS,
      a DAS mailbox assigned to said DAS for receiving messages from said PCS for delivery to said DAS, and
      an UIS mailbox assigned to said UIS for receiving messages from said PCS for delivery to said UIS.

2. The protocol converter of claim 1, wherein said PCS comprises a plurality of modules for running various processes to support PCS operations.

3. The protocol converter of claim 2, wherein said PCS further comprises an internal bus for providing data communications between said modules.

4. The protocol converter of claim 3, wherein said plurality of modules comprises producing modules for supplying data to said internal bus, and consuming modules for receiving data from said internal bus.

5. The protocol converter of claim 4, wherein said internal bus comprises multiple internal mailboxes assigned to said consuming modules.

6. The protocol converter of claim 5, wherein each of said internal mailboxes is adapted for receiving data from any of said producing modules.

7. The protocol converter of claim 6, wherein said internal bus is arranged to distribute data among said internal mailboxes in accordance with ID information provided by said producing modules.

8. The protocol converter of claim 7, wherein each of said consuming modules is assigned to a separate internal mailbox.

9. The protocol converter of claim 8, wherein said internal bus is adapted to provide priority communications between said modules.

10. The protocol converter of claim 9, wherein a separate priority mailbox is assigned to each of said consuming modules for receiving priority data.

11. The protocol converter of claim 10, wherein messages received from said data acquisition system are distributed via priority mailboxes.

12. The protocol converter of claim 1, wherein said process equipment comprises multiple process units.

13. The protocol converter of claim 12, wherein said data acquisition system provides a parallel data input/output interface with said multiple process units to provide independent data exchange with each of said process units.

14. The protocol converter of claim 13, wherein said PCS comprises multiple PCS instances for supporting communications with said multiple process units.

15. The protocol converter of claim 14, wherein a separate PCS instance is assigned to each of said process units.

16. A controller for supporting data communications with manufacturing process equipment controlled by a host computer, comprising:
   a protocol conversion server (PCS) for interfacing said process equipment to said host computer,
   an external device server (EDS) for interfacing said process equipment to an external control device,
   an external PCS mailbox assigned to said PCS for receiving messages from said EDS for delivery to said PCS, and
   an EDS mailbox assigned to said EDS for receiving messages from said PCS for delivery to said EDS,
   wherein said PCS comprises a plurality of modules for running various processes to support PCS operations and
   an internal bus for distributing messages among said modules.

17. The controller of claim 16, wherein said plurality of modules comprises producing modules for supplying data to said internal bus, and consuming modules for receiving data from said internal bus.

18. The controller of claim 17, wherein a separate internal mailbox of said internal bus is assigned to each of said consuming modules for receiving data from any of said producing modules.

19. The controller of claim 18, wherein said producing modules comprises a host request module for receiving request messages from said host computer, and said consuming modules comprises a host reply module for transmitting reply messages to said host processor.

20. The controller of claim 19, wherein said producing modules comprises an external request module for receiving messages delivered to said external PCS mailbox.

21. The controller of claim 20, wherein said consuming modules comprises an external device module for sending messages to said EDS mailbox.

22. The controller of claim 21, wherein said plurality of modules further comprises an equipment communication module for providing bidirectional communication with said process equipment.

23. The controller of claim 22, wherein said equipment communication module is adapted for bidirectional communication with said producing and consuming modules.

24. The controller of claim 23, wherein said PCS further comprises a data collection module adapted for bidirectional communication with said process equipment via said equipment communication module, for collecting a quality control data from said process equipment.

25. The controller of claim 24, wherein said data collection module is adapted to receive a request for the quality control data from its internal mailbox.

* * * * *